United States Patent
Bennetts et al.

(10) Patent No.: US 7,162,212 B2
(45) Date of Patent: Jan. 9, 2007

(54) SYSTEM AND METHOD FOR OBSCURING UNWANTED AMBIENT NOISE AND HANDSET AND CENTRAL OFFICE EQUIPMENT INCORPORATING THE SAME

(75) Inventors: David J. Bennetts, East Sussex (GB);
Lawrence A. Rigge, Emmaus, PA (US);
Richard P. Verney, Knaphill (GB)

(73) Assignee: Agere Systems Inc., Allentown, PA (US)

( * ) Notice: Subject to any disclaimer, the term of this patent is extended or adjusted under 35 U.S.C. 154(b) by 500 days.

(21) Appl. No.: 10/667,624

(22) Filed: Sep. 22, 2003

(65) Prior Publication Data
US 2005/0064826 A1    Mar. 24, 2005

(51) Int. Cl.
*H04B 1/04*    (2006.01)
(52) U.S. Cl. ............................... 455/114.2; 455/115.1; 455/296; 455/344
(58) Field of Classification Search ............... 381/71.1, 381/71.14, 71.9, 94.1; 455/114.2, 115.1, 455/296, 114.1, 344
See application file for complete search history.

(56) References Cited

U.S. PATENT DOCUMENTS

| | | | | |
|---|---|---|---|---|
| 5,673,325 A | * | 9/1997 | Andrea et al. | 381/94.1 |
| 5,680,393 A | * | 10/1997 | Bourmeyster et al. | 381/71.1 |
| 6,151,397 A | * | 11/2000 | Jackson et al. | 381/94.1 |
| 6,360,203 B1 | * | 3/2002 | Prince | 381/71.1 |
| 6,717,991 B1 | * | 4/2004 | Gustafsson et al. | 455/570 |
| 2002/0082007 A1 | * | 6/2002 | Hoisko et al. | 455/115.1 |
| 2003/0027591 A1 | * | 2/2003 | Wall | 455/344 |
| 2003/0228019 A1 | * | 12/2003 | Eichler et al. | 381/71.8 |
| 2004/0176025 A1 | * | 9/2004 | Holm et al. | 455/296 |
| 2004/0264705 A1 | * | 12/2004 | Hiipakka | 381/71.1 |
| 2005/0202835 A1 | * | 9/2005 | Sato et al. | 455/71.1 |
| 2006/0148528 A1 | * | 7/2006 | Jung et al. | 455/114.2 |

FOREIGN PATENT DOCUMENTS

| | | |
|---|---|---|
| DE | 10159281 A1 | 6/2003 |
| GB | 2357411 A | 6/2001 |
| GB | 2365241 A | 2/2002 |
| JP | 60006435 A | 1/1985 |
| JP | 11017589 A | 1/1999 |
| WO | WO 99/11045 | 3/1999 |
| WO | WO 00/53138 | 9/2000 |

\* cited by examiner

*Primary Examiner*—Lana Le

(57) ABSTRACT

A system for, and method of, obscuring ambient noise. In one embodiment, the system includes: (1) a background sound generator, (2) a mixer coupled to the background sound generator and (3) a user interface, coupled to the mixer, that, upon a user command, causes the mixer to mix an output of the background sound generator with a transmitted signal. The background sound may be music, white noise, colored noise, out-of-phase ambient noise, simulated alternative ambient noise or any other suitable background sound. The system may be associated with a wireless handset, a wireline handset, central office equipment or any other suitable location or equipment.

15 Claims, 2 Drawing Sheets

SYSTEM AND METHOD FOR OBSCURING UNWANTED AMBIENT NOISE AND HANDSET AND CENTRAL OFFICE EQUIPMENT INCORPORATING THE SAME

TECHNICAL FIELD OF THE INVENTION

The present invention relates to telecommunications devices and services, and particularly to wireless and wireline telephones and voice services associated therewith.

BACKGROUND OF THE INVENTION

Communication systems are well established for establishing voice communication between two calling parties, and further such voice communications using mobile telephony are well established.

In such communication systems, it is well-known that in addition to a voice signal communicated from one party to another, ambient noise, reflecting the environment of the party, is also communicated. For example, the ambient noise may include traffic noise or general conversation noise from background conversations in a room.

In certain circumstances, the ambient noise for a party to the call may not be suitable for the nature of the call. For example, a business user making a call in a particular environment may wish not to convey the ambient noise of the environment in which he or she is making the call.

Furthermore, it is currently well-known in the field of communications that entertaining services in the field of mobile communications in particular are in great demand. Therefore any service which offers an entertaining aspect, or a novelty aspect, is desirable.

It is an aim of the present invention to provide a technique for enhancing voice communications.

SUMMARY OF THE INVENTION

According to the present invention, a system for, and method of, obscuring ambient noise. In one embodiment, the system includes: (1) a background sound generator, (2) a mixer coupled to the background sound generator and (3) a user interface, coupled to the mixer, that, upon a user command, causes the mixer to mix an output of the background sound generator with a transmitted signal.

The background sound generator may synthesize the output, reproduce the output from stored background sound data, reproduce the output from a data stream received in real time or generate the output in any suitable manner. The background sound may be music, white noise, colored noise, out-of-phase ambient noise, simulated alternative ambient noise or any other suitable background sound. The system may be associated with a wireless handset, a wireline handset, central office (e.g., base station) equipment or any other suitable location or equipment.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

The present invention is described herein by way of reference to a particular preferred example. One skilled in the art will appreciate that the invention is not limited to such a specific example.

The purpose of the present invention is to provide, in addition to a voice signal from a near-end user to a far-end user in a communication network, a background sound at the near-end-user's choice. As is discussed further hereinbelow, the source of ambient noise is preferably selectable by the near-end user. Thus a near-end user is able to obscure, at least to some extent, the ambient noise which a far-end user hears. The near-end user may be a calling party or a called party. In a call connection, both parties may be considered to be near-end users or far-end users: the near-end user is the party that is controlling the background noise for their voice, which may be both parties.

For the purpose of the following description, it is assumed that the calling party is provided with a handset equipped with a user interface in accordance with the present invention (which may be a conventional wireless or wireline handset keypad). Thus in the following the calling party may be considered a near-end user and the called party is the far-end user. It will be understood by one skilled in the art, however, that in the following example the called party may also have a handset adapted in accordance with the present invention such that they may act as a near-end user when speaking.

Figure 1:
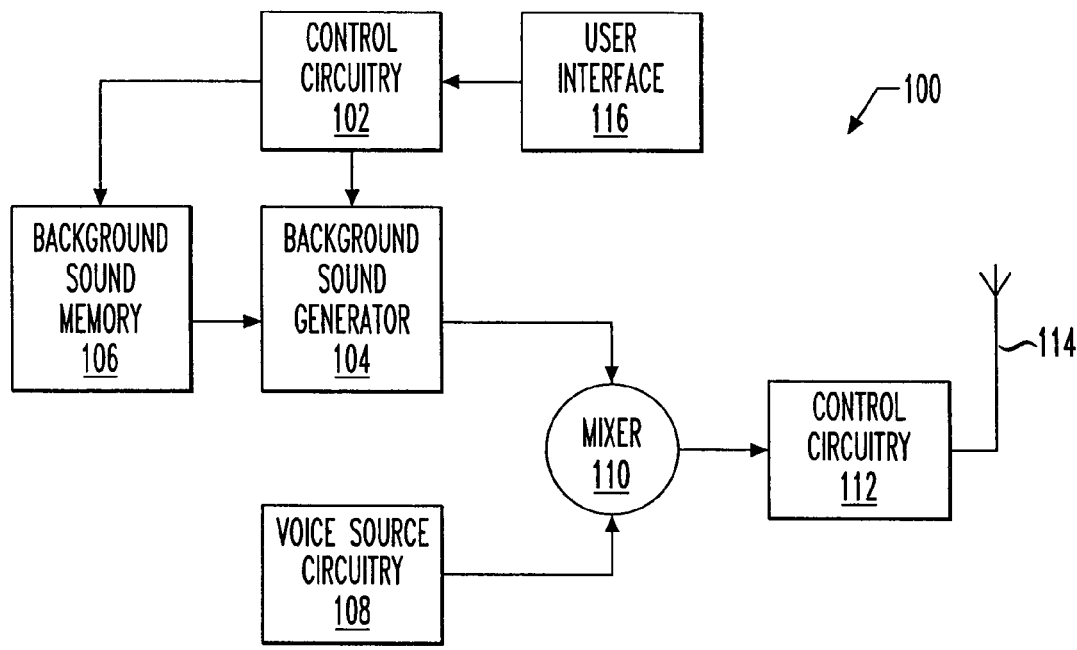
FIG. 1 illustrates a wireless or wireline handset implementing an embodiment of the present invention.

FIG. 1 illustrates a block diagram of elements of a communications handset used by a calling party in one embodiment of the present invention.

The communications handset 100 comprises control circuitry 102, a background sound generator 104, a background sound memory 106, voice source circuitry 108, a mixer 110, output circuitry 112, an antenna 114 and a user interface 116.

The voice source circuitry 108 represents a standard circuit in a communications handset for receiving a voice of a user of the handset and converting such voice into a form suitable for transmission on a communication interface. The voice source circuitry 108 may therefore generate a voice signal at its output in accordance with an appropriate telephony standard. The output circuitry 112 is similarly conventional output circuitry suitable for converting the voice signal at the output of the voice source circuitry 108 into a form suitable for transmission by the antenna 114.

In accordance with the present invention, there is further provided the background sound generator 104 for generating a background sound signal output. The mixer 110 mixes the background sound signal output with the transmitted signal provided by the voice source circuitry 108, and the output of the mixer 110 forms the input to the output circuitry 112.

Thus the transmitted signal, together with the background sound mixed therewith, is transmitted on the appropriate transmission link.

In embodiments of the invention the background sound generator 104 may provide an output in a variety of ways. The background sound generator 104 may synthesize the output (as described below), reproduce the output from stored background sound data, reproduce the output from a data stream received in real time or generate the output in any suitable manner. Those skilled in the pertinent art will readily see how these alternative ways can be implemented.

The background sound generator 104 is, in the illustrated embodiment, controlled by the control circuitry 102, which in addition preferably controls a background sound memory 106, which provides inputs to the background sound generator 104. In the illustrated embodiment, the background sound memory 106 stores a plurality of different background sounds. The user of the communications handset is able to select a particular background sound using the user interface 116, and the control circuitry 102 detects selection of the appropriate background sound and controls the background sound memory 106 to provide such to the background sound generator 104.

The background sound may be music, white noise (random noise equal in time-averaged amplitude over its spectrum), colored noise (random noise that varies in time-averaged amplitude over its spectrum), out-of-phase ambient noise (carried out by sensing the ambient noise and about 180° phase-shifting it to yield background sound), simulated alternative ambient noise or any other suitable background sound.

The advantage of the embodiment of FIG. 1 is that only handsets requires modification (other telecommunications infrastructure can remain intact) and that background sounds can probably be more user-customizable, as they are stored or synthesized in the communications handset 100.

Figure 2:
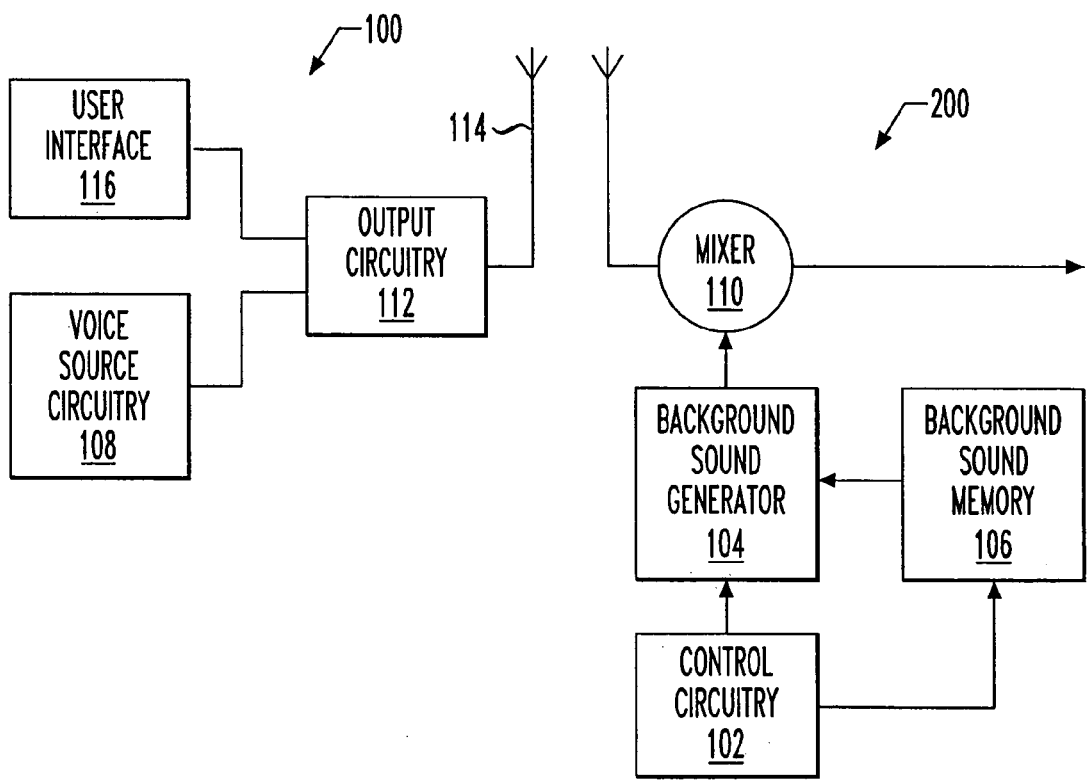
FIG. 2 illustrates central office equipment implementing an embodiment of the present invention.

FIG. 2 illustrates central office equipment 200 implementing an alternative embodiment of the present invention. Many of the elements of FIG. 1 are present in the embodiment of FIG. 2. However, the control circuitry 102, the background sound generator 104, the background sound memory 106, and the mixer 110 have been relocated to the central office equipment 200. The other elements remain in the communications handset 100.

The user issues a command via the user interface 116, as before. The command is directed to the central office equipment 200, wherein the background sound generator 104 is, under control of the control circuitry 102, engaged to generate a background sound. As before, the sound may be stored in the background sound memory 106 or synthesized as described both above and below. The mixer 110 mixes the background sound into the user's transmitted signal. The advantage of this embodiment is that no handset requires modification, almost certainly a greater number of possible background sounds can be made available to the user and a charge can be levied for background sound, which now takes the form of a service.

Figure 3:
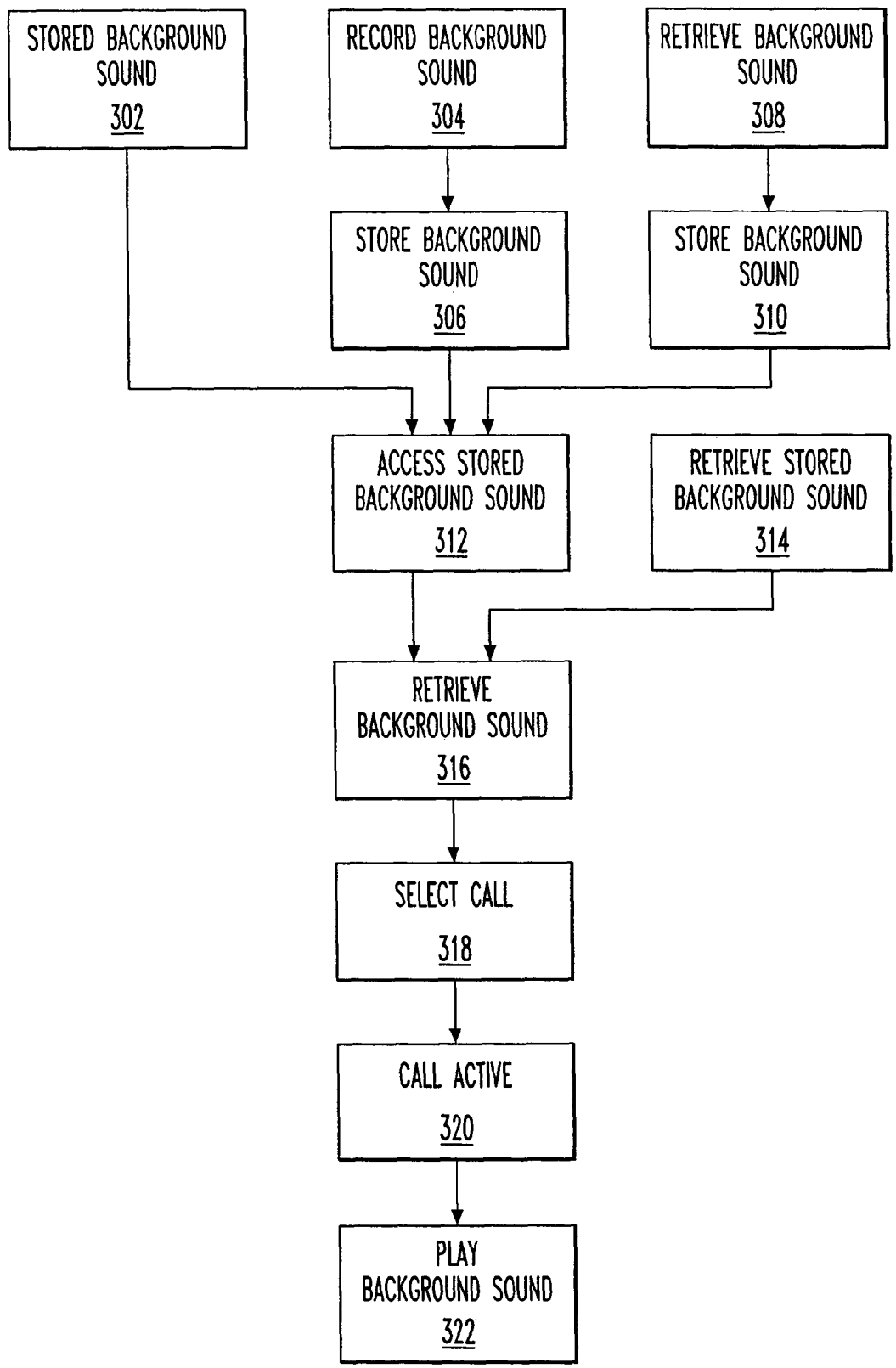
FIG. 3 illustrates an embodiment of a method of obscuring ambient noise according to the present invention.

Turning now to FIG. 3, in one embodiment, background sounds are pre-stored in a memory of the communications handset. As such, a user of the handset is able to select a particular pre-stored background sound in a step 302 from the pre-stored background sounds available.

In a second embodiment, or in an embodiment additional to the first embodiment, the background sound may be recorded by the user using the telephony handset in a step 304. The recorded background sound may then be stored in the background sound memory in a step 306.

In a third embodiment, which may be used in combination with either the first or second embodiment, the user may retrieve a background sound in a step 308. The background sound may be retrieved, for example, from an Internet website or through being copied from another handset. The retrieved background sound is again stored in the background sound memory in a step 310.

When using the handset, and prior to making a telephone call, the user of the handset accesses stored background sounds in a step 312. In step 312, the user gains access to the background sound stored in the background sound memory 106. In an alternative embodiment, which embodiment may be provided in parallel with any of the first, second and third embodiments, the user of the handset may gain access to a background sound dynamically, by receiving a streamed background sound, for example via a live Internet access. This embodiment is represented by step 314.

In step 316, the user of the telephony handset selects the appropriate background sound, either by retrieving from stored background sounds in step 312 or receiving a streamed background sound in 314.

Thereafter, the user selects a number for calling in a step 318, and the call becomes active in step 320. When the call becomes active, the control circuitry 102 controls the background sound generator 104 in a step 322 and the background sound is played.

Thus, the called party hears the voice of the calling party together with the appropriate background sound. A user of a telephony system may select an appropriate background sound to accompany their telephone call.

It will be understood that the invention is not limited to the embodiments described with reference to FIGS. 1, 2 and 3, and further modifications and adaptations may be incorporated. For example, in the foregoing there is discussed the possibility of the background sound being pre-stored, recorded, retrieved or live-streamed. Such sources for the background sound are not exhaustive. There is envisaged, for example, a further embodiment in which there is provided a means for generating background sounds, such as FM synthesis. FM synthesis may provide a lower cost implementation than the provision of storage means for storing background sounds.

In the above-described embodiments, activation of the background sounds is initiated by the calling party. For example the calling party may select a background sound using a menu provided on the user interface of the calling parties handset. The background sounds may be pre-programmed, for example stored in the background sound memory 106 of FIG. 1. Where the background sounds are pre-programmed, the calling party may select a change of background sound based on a programmed trigger. For example, the background may change based on selection of a pre-programmed button on the handset, an elapsed time period associated with a timer, or responsive to voice activation. Such changes also are not limited to arrangements where the background sounds are pre-stored. A dynamic change of background noise may similarly be triggered responsive to such stimuli.

In the embodiments described above, the techniques described are based on the calling party selecting a background noise. In alternative arrangements, the background noise selection may be automated, for example in dependence on the identity of the number called. Further the invention is not limited to implementations where a call is made or initiated from a handset.

In embodiments, the handset may be further adapted such the volume of the background noise may be controllable.

The ability to choose a background noise as described above applies also to a called party. Again in the case of a called party, in addition to the user selective techniques described herein, the background noise selection may be automated. For example the background noise may be automatically selected in dependence on the caller identity. A particular background noise may be associated, for example, with an unknown caller.

Although the present invention has been described in detail, those skilled in the art should understand that they can make various changes, substitutions and alterations herein without departing from the spirit and scope of the invention in its broadest form.

What is claimed is:

1. A system for obscuring ambient noise, comprising:
   a background sound generator;
   a mixer coupled to said background sound generator; and
   a user interface, coupled to said mixer, that, upon a user command, causes said mixer to mix an output of said background sound generator with a transmitted signal, said output selected from a group consisting of music, white noise, colored noise, out-of-phase ambient noise, and simulated alternative ambient noise.

2. The system as recited in claim 1 wherein said background sound generator synthesizes said output.

3. The system as recited in claim 1 wherein said background sound generator reproduces said output from stored background sound data.

4. The system as recited in claim 1 wherein said background sound generator reproduces said output from a data stream received in real time.

5. The system as recited in claim 1 wherein said output is selectable via said user interface.

6. The system as recited in claim 1 wherein said system is associated with a selected one of:
   a wireless handset, and
   a wireline handset.

7. A handset comprising the system as recited in claim 1.

8. The handset as recited in claim 7 wherein said handset is selected from the group consisting of:
   a wireless handset, and
   a wireline handset.

9. Central office equipment comprising the system as recited in claim 1.

10. A method of obscuring ambient noise, comprising:
    generating a background sound selected from a group consisting of that is music, white noise, colored noise, out-of-phase ambient noise, and simulated alternative ambient noise; and
    responding to a user command by mixing said background sound with a transmitted signal.

11. The method as recited in claim 10 wherein said generating comprises synthesizing said background sound.

12. The method as recited in claim 10 wherein said generating comprises reproducing said background sound from stored background sound data.

13. The method as recited in claim 10 wherein said generating comprises reproducing said background sound from a data stream received in real time.

14. The method as recited in claim 10 wherein said output is selectable via said user interface.

15. The method as recited in claim 10 wherein said method is carried out in a selected one of:
    a wireless handset,
    a wireline handset, and
    a central office.

* * * * *